(12) United States Patent
Marukawa (10) Patent No.: US 7,080,252 B2
(45) Date of Patent: Jul. 18, 2006

(54) METHOD AND APPARATUS FOR SECURE DATA TRANSMISSION VIA NETWORK

(75) Inventor: Katsumi Marukawa, Sagamiko (JP)

(73) Assignee: Hitachi, Ltd., Tokyo (JP)

( * ) Notice: Subject to any disclaimer, the term of this patent is extended or adjusted under 35 U.S.C. 154(b) by 804 days.

(21) Appl. No.: 09/759,247

(22) Filed: Jan. 16, 2001

(65) Prior Publication Data

US 2001/0018740 A1    Aug. 30, 2001

(30) Foreign Application Priority Data

Jan. 18, 2000   (JP)   ............................. 2000-013894

(51) Int. Cl.
G06K 5/00 (2006.01)
(52) U.S. Cl. ..................... 713/176; 713/176; 713/180; 235/375; 380/51
(58) Field of Classification Search ................ 713/180, 713/176
See application file for complete search history.

(56) References Cited

U.S. PATENT DOCUMENTS

| | | | |
|---|---|---|---|
| 5,579,393 A | | 11/1996 | Conner et al. |
| 5,912,972 A | | 6/1999 | Barton |
| 6,170,744 B1 | * | 1/2001 | Lee et al. ................... 235/380 |
| 6,278,791 B1 | * | 8/2001 | Honsinger et al. .......... 382/100 |
| 6,598,162 B1 | * | 7/2003 | Moskowitz .................. 713/176 |
| 6,754,908 B1 | * | 6/2004 | Medvinsky ................. 725/107 |
| 6,757,826 B1 | * | 6/2004 | Paltenghe ................... 713/170 |

FOREIGN PATENT DOCUMENTS

EP    676877    10/1995

OTHER PUBLICATIONS

Schneier, B. Applied Cryptography 1996 John wiley & Sons, Inc. 2nd Edition, pp. 34-43.*
Barry, Hudson, A Single Path Towards Achieving Information Privacy and Record Authentication, Presentation for Inforum 1998.*

* cited by examiner

Primary Examiner—Ayaz Sheikh
Assistant Examiner—Taghi T. Arani
(74) Attorney, Agent, or Firm—Mattingly, Stanger, Malur & Brundidge, P.C.

(57) ABSTRACT

A method and apparatus for secure data transmission via network. Transmission side transmits processed data (DB), second signed data (SB, 740) obtained by applying one-way function to merged data of the processed data (DB) and first signed data of an original image and ciphering the output of the one-way function with transmission side secret key, and ciphered signed data (SAE) obtained by ciphering the first signed data with reception side public key. Data reception side enciphers received ciphered signed data (SAE') with reception side secret key to obtain third signed data (SA'), applies one-way function to merged data (DC') of received processed data (DB') and the third signed data (SA'), enciphers received second signed data (SB') with transmission side public key (KDB), compares result obtained by applying the one-way function to the merged data with result obtained by enciphering the second signed data for data valification.

12 Claims, 8 Drawing Sheets

| | |
|---|---|
| 診療実日数 1 | ACTUAL NUMBER OF DAYS |
| 1 7 5 | TOTAL |
| | APPROVED |

805

| | |
|---|---|
| ○○○○4 5 | REFERENCE NUMBER — 800 |
| 平成 4年 2月分 | CONSULTATION MONTH |
| 01. 1578. 8 | MEDICAL CODE |
| 大あいた ·298 | ROOM NUMBER |
| 男㊛ 明·大·㊉平 24 年生 | SEX AND BIRTH YEAR |

METHOD AND APPARATUS FOR SECURE DATA TRANSMISSION VIA NETWORK

BACKGROUND OF THE INVENTION

The present invention relates to security in exchanging data via a network, and particularly relates to security in transmitting an original image or processed data of a partial image or the like produced by working the original image when an image obtained by scanning a form, chit, slip or the like is electronically exchanged via a network.

As technology relating to security in data transmission, for example, there has been known a digital signature disclosed, for example, in S. Tujii and M. Kasahara: Cryptography and Information Security, p. 127–139, SHOKODO (1999).

SUMMARY OF THE INVENTION

Figure 7:
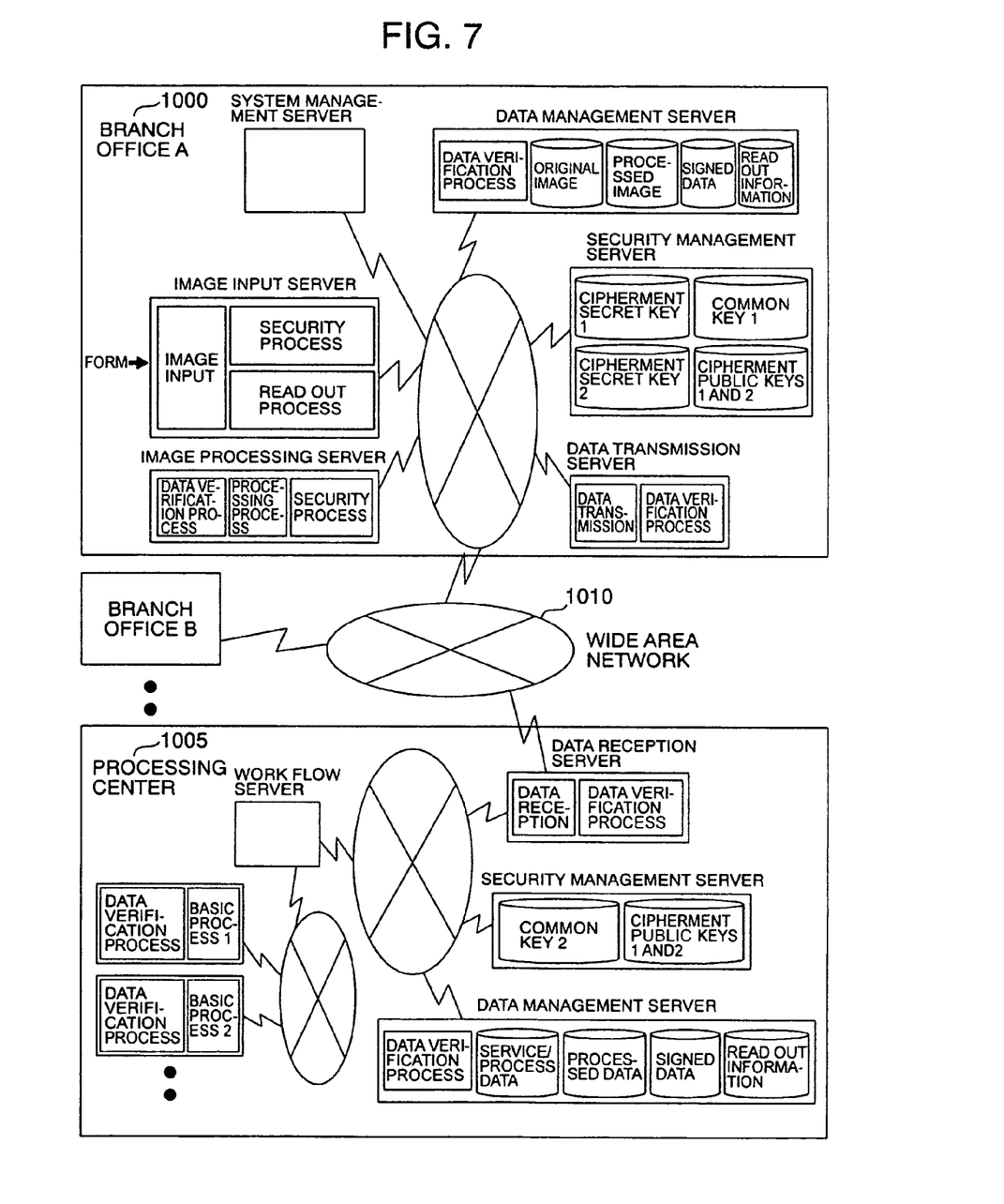
FIG. 7 is a block diagram showing an example of configuration of a transmission system to which the present invention is applied.

FIG. 7 is a block diagram showing an example of the configuration of a data transmission apparatus for transmitting data obtained by working or processing an input image of a form or the like.

When data is transmitted between a branch office A 1000 and a processing center 1005 connected via a network 1010 as shown in FIG. 7, a data reception side can verify that received data was transmitted from a proper transmission side, and can verify that the received data has not been substituted. Such verification is realized by public public key cryptography using a secret key and a public public key produced by the transmission side.

Figure 2A:
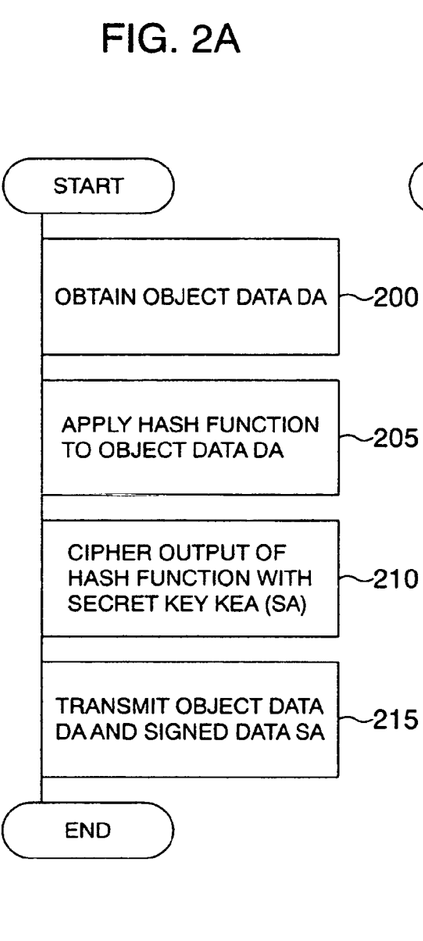
FIGS. 2A and 2B are flow charts showing data transmission side processing and data reception side processing in a data transmission method using a digital signature in a data transmission apparatus as shown in FIG. 7, respectively.
Figure 2B:
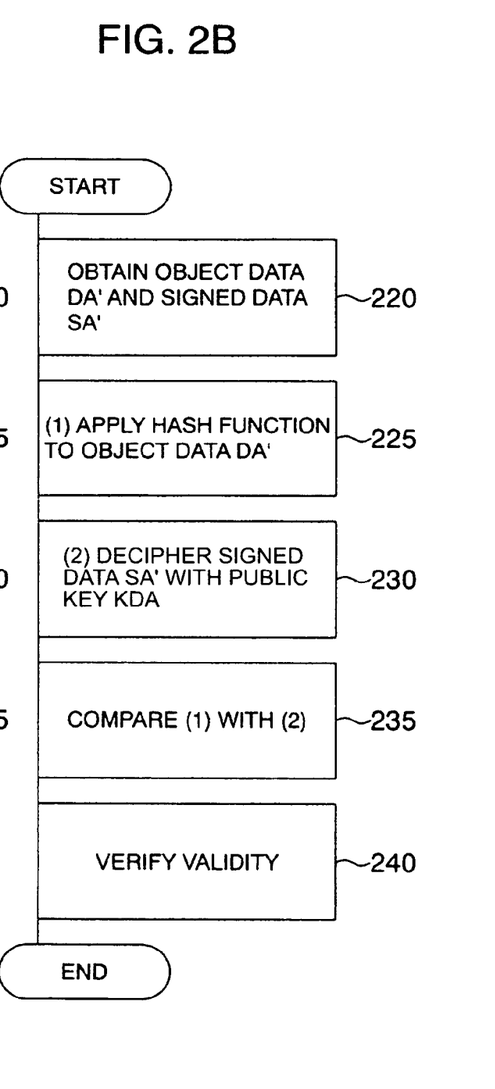

FIG. 2A shows an example of processing flow of data transmission using a digital signature in the data transmission apparatus shown in FIG. 7. Object data DA to be transmitted is obtained (Step 200). A hash function is applied to the object data DA (Step 205). The output of the hash function is ciphered with a secret key KEA of the data transmission side so that signed data SA is produced (Step 210). The data DA and SA are transmitted to the data reception side (Step 215). On the other hand, FIG. 2B shows an example of processing flow for verifying the validity of the transmitted data. Object data DA' and signed data SA' are obtained (Step 220). A hash function is applied to the data DA' (Step 225). The signed data SA' is enciphered with a public key KDA distributed in advance (Step 230). Then, the results of Step 225 and Step 230 are compared (Step 235), and the validity of the data is verified on the basis of the result of the comparison (Step 240). Here, it is concluded that there has been no illegal act if the compared data are coincident with each other, and there was some illegal act if they are not coincident with each other.

However, there is no way to verify whether the processed data was produced from the original image or not and carry out the aforementioned verification at the same time. Further, if the data has been substituted, there is no way to find the original image.

Figure 6:
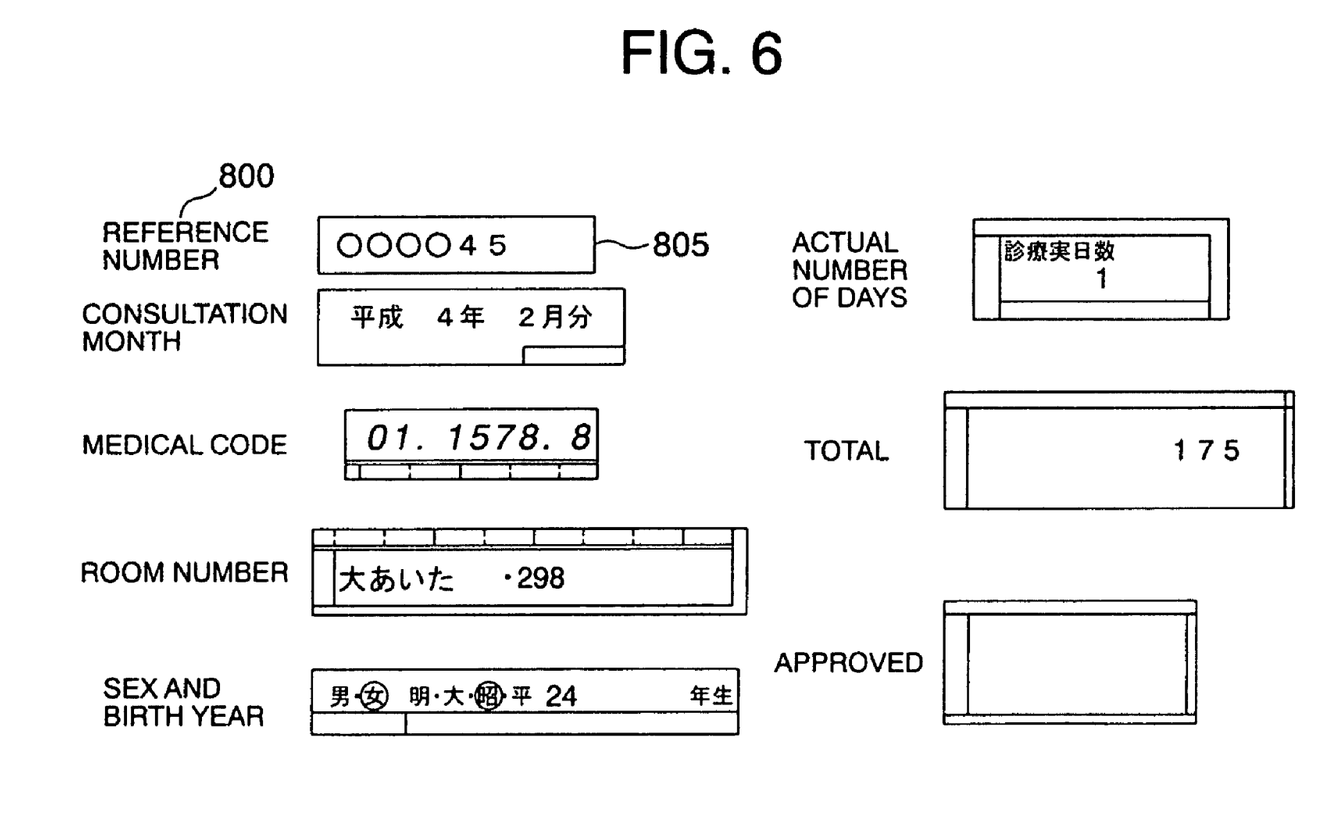
FIG. 6 is a view showing examples of necessary partial images in an original image which is an object to be worked.

In governmental or non-governmental offices dealing with a vast volume of forms, slips, chits or the like, there are needs to convert paper media into digital media and connect deployed centers and branch offices to use the digital media to thereby speed up services. To satisfy such needs, there has appeared a configuration of service in which paper media are converted into images and the images are applied to a work flow. In such a configuration, processed data such as partial images required for services are managed on account of efficiency in data transmission or the like. Such partial images of a medical/insurance document as shown in FIG. 6, of original images, partial images required for services, for example, a reference number, a consultation month, a medical code, a room number, a birth date, etc. are cut out or picked up and transmitted from the branch office A 1000 to the processing center 1005 via the network 1010 in FIG. 7. If the whole of the original image is to be transmitted, the volume of data becomes large. In addition, if the original image is displayed, there is a fear that information involving privacy leaks out. Therefore, required partial images are cut out or picked up and transmitted from the branch office A to the processing center. Operators engage in data input service while viewing the displayed partial images.

However, when data is transmitted via a network, original images or processed data flowing on the network may be eavesdropped or listened in or illegally substituted partially or wholly. Further, illegal transactions may be achieved by impersonation. It is desired to prevent such problems. In order to prevent such problems, it is necessary to verify an illegal act of substitution based on impersonation.

As a method of the verification, a digital signature based on public key cryptography has been known as described above. However, if the original image or the processed data per se is listened in and a secret key used in an image input portion or a processed data processing portion is stolen, the eavesdropper or listener-in may substitute the original image or the processed data easily or transmit data to a transmission line by impersonation. Thus, there arises a problem that the data reception side cannot detect such an illegal act and may be deceived and make an inappropriate process. Therefore, it is desired to provide a method for verifying substitution of the original image or the processed data based on impersonation while verifying whether the processed data was produced from the original image or not and further for finding the original image easily if it is concluded that the original image has been substituted.

In addition, if the transmitted data has been substituted, it is necessary to find the substituted original image in early stages and extract necessary information again.

It is an object of the present invention to provide a method in which in the case where an original image or processed data was listened in and a secret key used in a data input portion or in a processed data processing portion was stolen, even if the listener-in transmits substituted data of the original image or the processed data by impersonation, the data reception side judges such an illegal act and verifies whether received data was produced from the original image or not.

It is another object of the present invention to provide a method in which the data reception side verifies whether the processed data is produced from the original data or not, and if the data reception side finds that the received data is substituted image, the data reception side obtains the original image quickly.

In order to attain the foregoing objects, in a data transmission method according to an aspect of the present invention, a data transmission side merges processed data DB obtained by working or processing an original image DA with signed data SA obtained by applying a digital signature to the original image. Then, the data transmission side applies a one-way function to the merged data, and ciphers the output of the one-way function with a secret key of the data transmission side so as to obtain signed data SB. Then, the signed data SA obtained by applying a digital signature to the original image DA is ciphered with a public key of a data reception side so that ciphered signed data SAE is obtained. Then, the data transmission side transmits the processed data DB, the signed data SB and the ciphered signed data SAE to the data reception side.

On the other hand, the data reception side obtains ciphered signed data SAE' and enciphers the ciphered signed data SAE' with a secret key of the data reception side to thereby obtain signed data SA'. The data reception side merges obtained processed data DB' with the signed data SA', and applies a one-way function to the merged data. Then, the data reception side enciphers obtained signed data SB' with a public key of the data transmission side, and compares the output of the one-way function applied to the merged data obtained by merging the processed data DB' and the signed data SA' with the result of enciphering the signed data SB' with a public key of the data transmission side. Thus, data validity is verified.

In the date transmission method according to another aspect of the present invention, the data transmission side merges an original image DA with signed data SA obtained by applying a digital signature to the original image. Then, the data transmission side applies a one-way function to the merged data, and ciphers the output of the one-way function with a secret key of the data transmission side so as to obtain signed data SB. The signed data obtained by applying a digital signature to the original image DA is ciphered with a public key of a data reception side so that ciphered signed data SAE is obtained. Then, the data transmission side transmits the original image DA, the signed data SB and the ciphered signed data SAE to the data reception side.

On the other hand, the data reception side obtains ciphered signed data SAE' and enciphers the ciphered signed data SAE' with a secret key of the data reception side to thereby obtain signed data SA'. The data reception side merges obtained original image DA' with the signed data SA', and applies a one-way function to the merged data. Then, the data reception side enciphers obtained signed data SB' with a public key of the data transmission side, and compares the output of the one-way function applied to the merged data obtained by merging the original image DA' and the signed data SA' with the result of enciphering the signed data SB' with a public key of the data transmission side. Thus, data validity is verified.

According to a feature of the present invention, in place of the signed data SA obtained by applying a digital signature to the original image in the data transmission apparatus according to the present invention described in the first and in the last, signed data obtained by applying a digital signature to data associated with the original image may be used. As the data associated with the original image data, for example, the volume of data of the original image, the number of black pixels included in a binarized image obtained by processing the original image, and so on, may be used.

Another feature of the present invention is as follows. When disagreement is given as the result of comparison of the output of the one-way function applied to the merged data with the result of enciphering the signed data SB' with the public key of the data transmission side in the data transmission apparatus according to the present invention described in the first and in the last:

the data reception side transmits the signed data SA' obtained by enciphering the received ciphered signed data SAE' with the secret key of the data reception side to the data transmission side; and the data transmission side searches for an original image corresponding to signed data coinciding with the signed data SA' sent to the data transmission side.

According to a further aspect of the present invention, a data transmission apparatus comprises:

first ciphering means for receiving an electronic image of an original image and a first secret key as inputs, and outputting a first digital signature obtained by ciphering the electronic image with the first secret key;

processing means for receiving the electronic image as input, and outputting a partial or processed image of the electronic image;

second ciphering means for receiving the partial or processed image, the first digital signature and a second secret key as inputs, merging the partial or processed image and the first digital signature, ciphering obtained merged data with the second secret key, and outputting an obtained second digital signature;

third ciphering means for receiving the first digital signature and a public key as inputs, and obtaining ciphered data of the first digital signature with the public key; and transmitting means for transmitting the partial or processed image, the second digital signature, and the ciphered data of the first signature to an external data channel.

BRIEF DESCRIPTION OF THE DRAWINGS

The forgoing and other objects, features and advantages of the invention will be apparent from the following more detailed description of the preferred embodiments of the invention as illustrated in the accompanying drawings wherein.

DESCRIPTION OF THE EMBODIMENTS

The present invention utilizes a digital signature based on public key cryptography. The principle will be described with reference to FIG. 5 and FIGS. 1A and 1B. In a rough flow of data, an original image 720 is obtained by an image input operation at an image input portion 700 of a branch office 780, and is worked or processed at a processing operation portion 705. Then, processed data 730 is transmitted from a data transmission server 785 to a service process portion of a processing center 710 via networks 750 and 715 so as to be subjected to a service. In this flow, if listen-in is carried out on the networks and a secret key used in the image input operation or the processing operation is stolen, there arises a problem of data substitution by impersonation.

Figure 5:
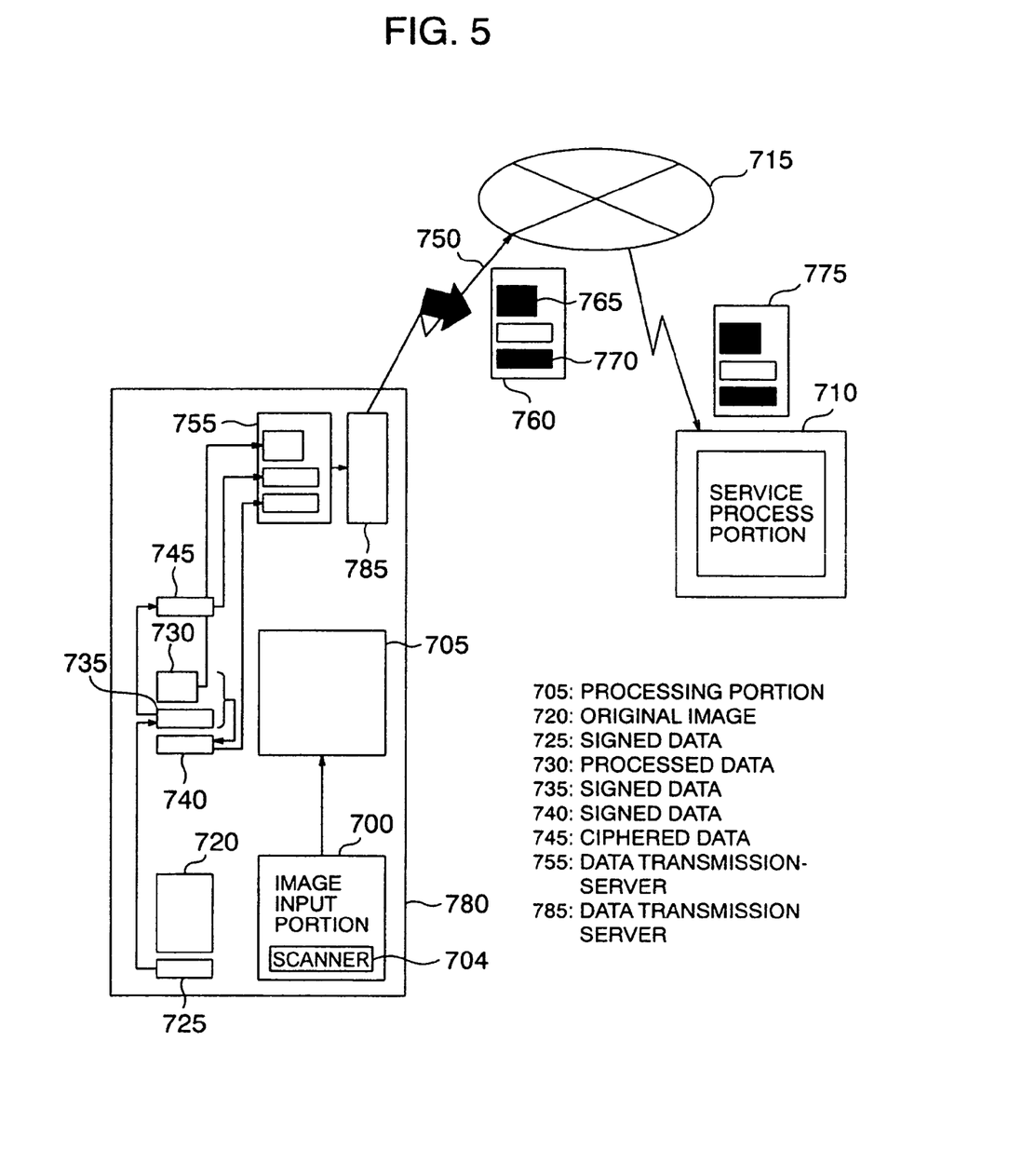
FIG. 5 is a view showing a flow from data transmission to data reception about an original image, processed data, signed data, etc. useful for description of the embodiment of the present invention.

Next, in order to explain the principle, description will be made about data to be dealt with. Reference numeral 720 represents an original image of information written on a recording medium such as paper read out by scanning the recording medium with a scanner 704; 725, signed data obtained by a digital signature using a secret key used in the image input operation; 730, processed data processed or worked in the processing operation portion; 735, the signed data 725; 740, signed data obtained by merging the processed data 730 and the signed data 735 to thereby form one unit of merged data and applying a digital signature to the merged data with a secret key of the processing operation portion; 745, data obtained by ciphering the signed data 735 with a public key used in the service process of the processing center 710; 755, a data group to be transmitted to the processing center 710, constituted by the data 730, 745 and 740. Further, reference numeral 760 represents data including data 765 obtained by listening in to the data group 755 on the network 750 and substituting the data 730, and signed data 770 obtained by merging the data 765 and 745 to thereby form a block of merged data and applying a digital signature to the merged data with the secret key stolen from the processing operation portion. Reference numeral 775 represents substituted data sent to and received by the processing center 710 by impersonation.

Conventionally, signed data obtained by a digital signature using the processed data 730 and the secret key in the processing operation unit is used. Therefore, a listener-in who stole the secret key in the processing operation portion can substitute the processed data easily, make up the signed data and transmit those data to the processing center while impersonating the processing portion. However, the data reception side cannot verify such an illegal act.

Figure 1A:
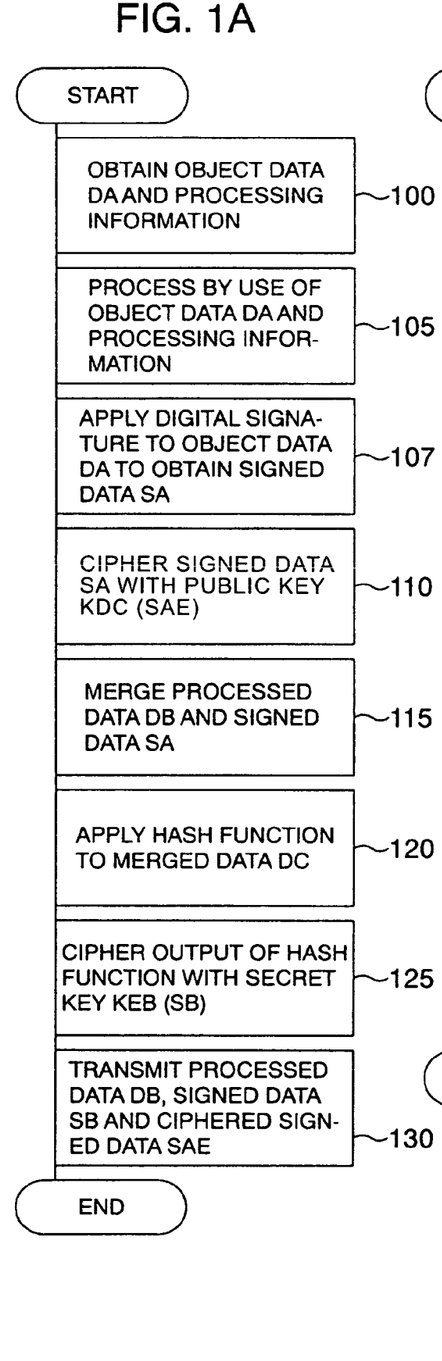
FIGS. 1A and 1B are flow charts showing data transmission side processing and data reception side processing in a data transmission method according to an embodiment of the present invention, respectively.

FIG. 1A is a flow of processing on the data transmission side in FIG. 5. Object data DA which is an original image and processing information are obtained (Step 100). Here, for example, when a partial image is dealt with, the processing information means coordinates of a partial area to be dealt with. Then, processing with the object data DA and the processing information is performed (Step 105), and a digital signature is applied to the object data DA so that signed data SA is obtained (Step 107). The signed data SA is ciphered with a public key KDC used in the service process of the data reception side so that ciphered signed data SAE is obtained (Step 110). Next, the processed data DB and the signed data SA are merged to form a block of data DC (Step 115). A hash function is applied to the merged data DC (Step 120), and the output of the hash function is ciphered with a secret key used in the processing operation portion so that signed data SB is obtained (Step 125). The data DB, SB and SAE are transmitted to the data reception side (Step 130). Here, the data DB corresponds to the data 730 in FIG. 5; SB, the data 740; and SAE, the data 745.

Figure 1B:
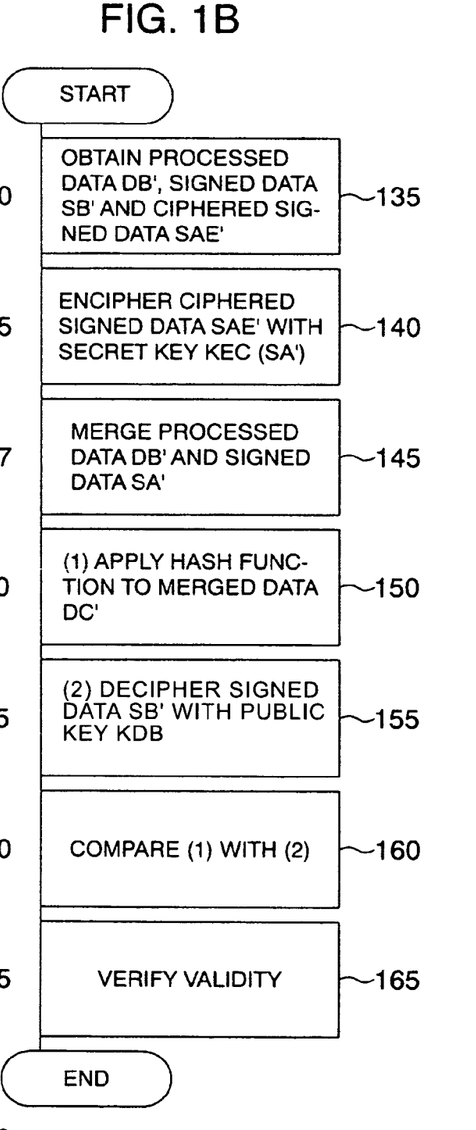

On the other hand, FIG. 1B is a flow of processing carried out on the data reception side in FIG. 5. Here, received processed data DB', signed data SB' and ciphered signed data SAE' are obtained (Step 135). The ciphered signed data SAE' is enciphered with a secret key KEC of the service process portion of the data reception side so that data SA' is obtained (Step 140). The data DB' and SA' are merged to form a block of data (Step 145), and a hash function is applied to merged data DC' (Step 150). Then, the signed data SB' is enciphered with a public key KDB of the processing operation portion of the data transmission side (Step 155). The results of Step 150 and 155 are compared (Step 160). On the basis of the result of the comparison, the data reception side can verify whether an illegal act was effected or not (Step 165).

The important point in this processing is the fact that one who can encipher the ciphered signed data SAE' is the data reception side because the data reception side has a secret key thereof. Even if a listener-in substitutes data or remakes signed data with the substituted data and the ciphered signed data, the results in Step 160 cannot agree with each other.

As is understood from the aforementioned flow, the ciphered signed data is not always required to be signed data of the original image, but it may be information relating to the original image, or the like. Examples of the information relating to the original image include: the volume of data of the original image; the number of black pixels included in a binarized image obtained by processing the original image; and so on.

The verification as to whether the processed data was produced from the original image or not is effected by comparing the values obtained by Steps 150 and 155 in FIG. 1B. If both the values are equal to each other, it is proved that the processed data was produced from the original image without any illegal act based on listen-in. Conversely, if the values are different from each other, there is a possibility that the data has been substituted. In such a case, it may be considered that the identification (ID) of the original image cannot be found from the substituted data. In such a case, the ciphered signed data transmitted to the data reception side is enciphered on the data reception side, and the enciphered signed data is sent to the data transmission side. The data transmission side searches for data-transmission-side signed data of the original image coinciding with the enciphered signed data. Thus, the original image can be found out.

Another embodiment will be described with reference to FIG. 3 about the processing operation in which a plurality of partial images are produced.

In this case, Steps 300 to 310 are the same as Steps 100 to 110 in FIG. 1A. Data processing from Step 320 to Step 335 branching from Step 315, which are executed for each of the partial images, are the same as that from Step 115 to Step 130 in FIG. 1A. The processing flow of FIG. 3 is different from FIG. 1A in that Step 315 executes the data processing repeatedly several times.

Figure 3:
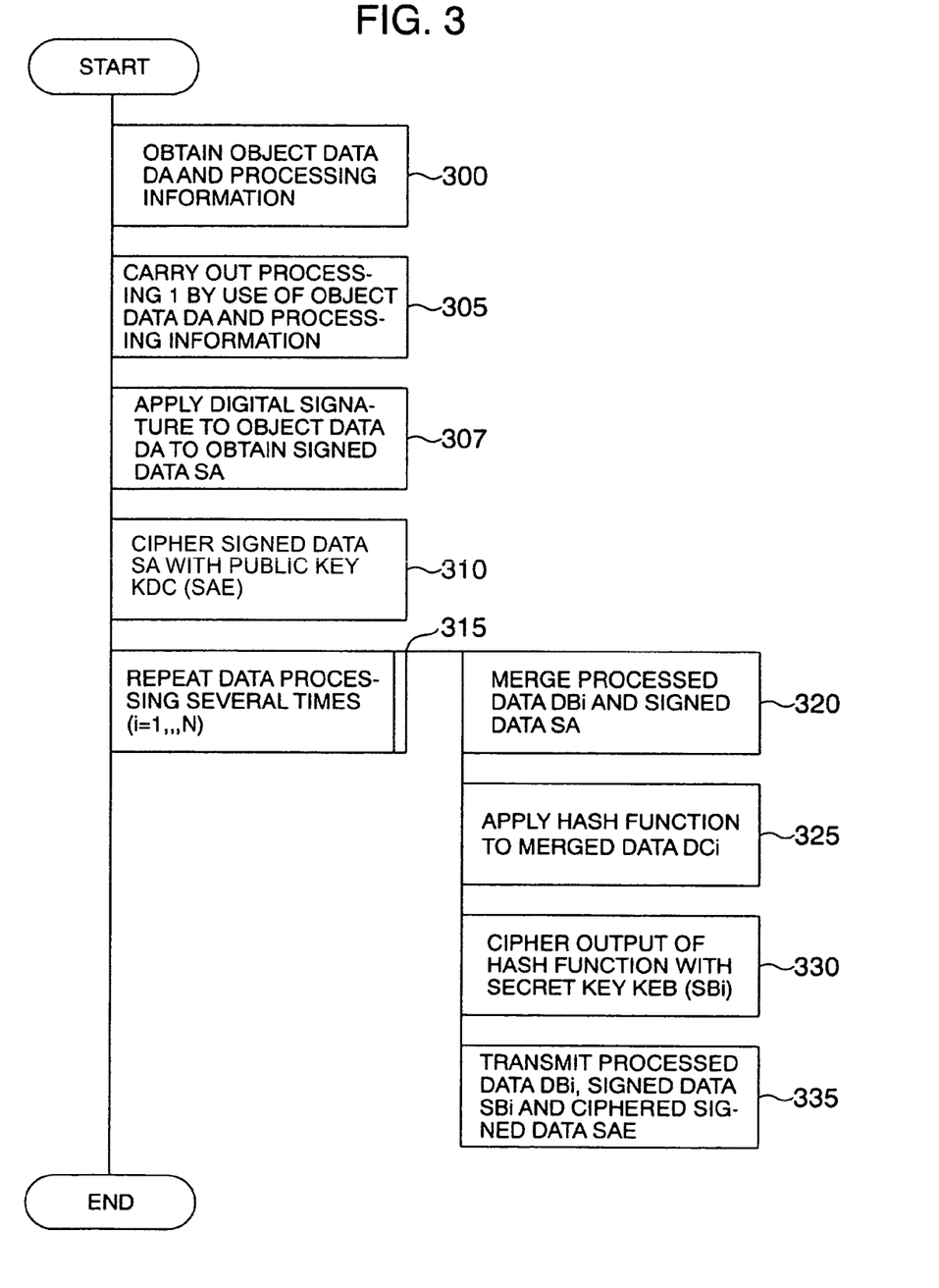
FIG. 3 is a flow chart showing processing on the data transmission side in a data transmission method according to another embodiment of the present invention in the case where there is a processing module of producing a plurality of partial images.
Figure 4:
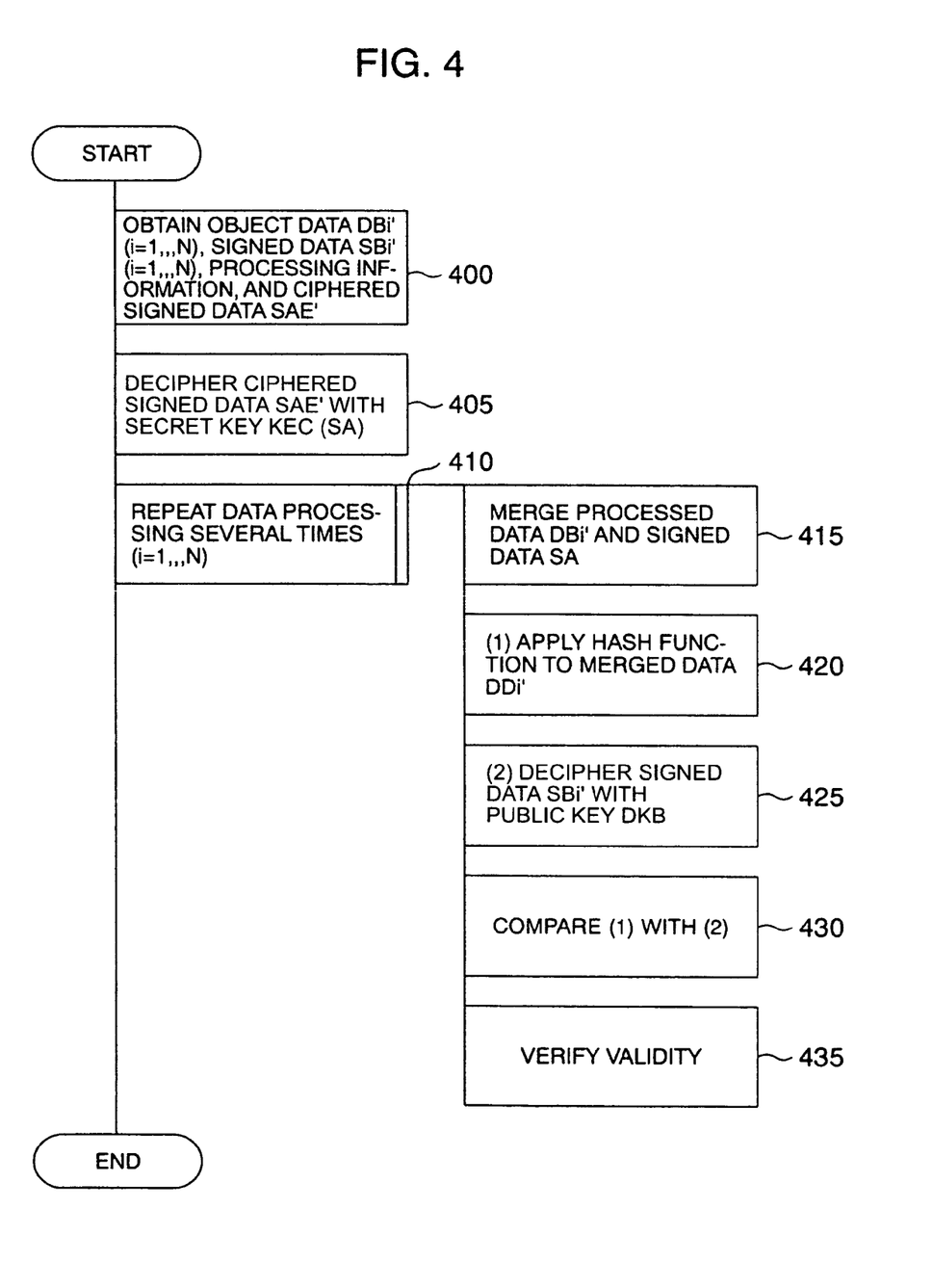
FIG. 4 is a flow chart showing processing on the data reception side in a data transmission method according to another embodiment of the present invention in the case where there is a processing module of producing a plurality of partial images.

FIG. 4 is a flow of processing for verification about transmitted data, which flow corresponds to the processing in FIG. 3. In the same manner as on the data transmission side, Steps 400 to 405 in FIG. 4 are the same as Steps 135 to 140 in FIG. 1B. Data processing from Step 415 to Step 435 branching from Step 410, which are executed for each of the partial images, are the same as that from Step 145 to Step 165 in FIG. 1B. The processing flow of FIG. 4 is different from FIG. 1B in that Step 410 executes the data processing repeatedly several times.

Thus, the partial images can be transmitted to the data reception side without being extracted and subjected to any illegal act based on listen-in. In addition, such an illegal act based on listen-in can be verified.

Although description was made above about security against listen-in on the transmission of processed data, it is possible to prevent an attack on the original image from a listener-in in the same manner as the processed data.

Description will be made below about a data transmission method according to another embodiment of the present invention which can verify an illegal act of a listener-in in to the original image.

Figure 8A:
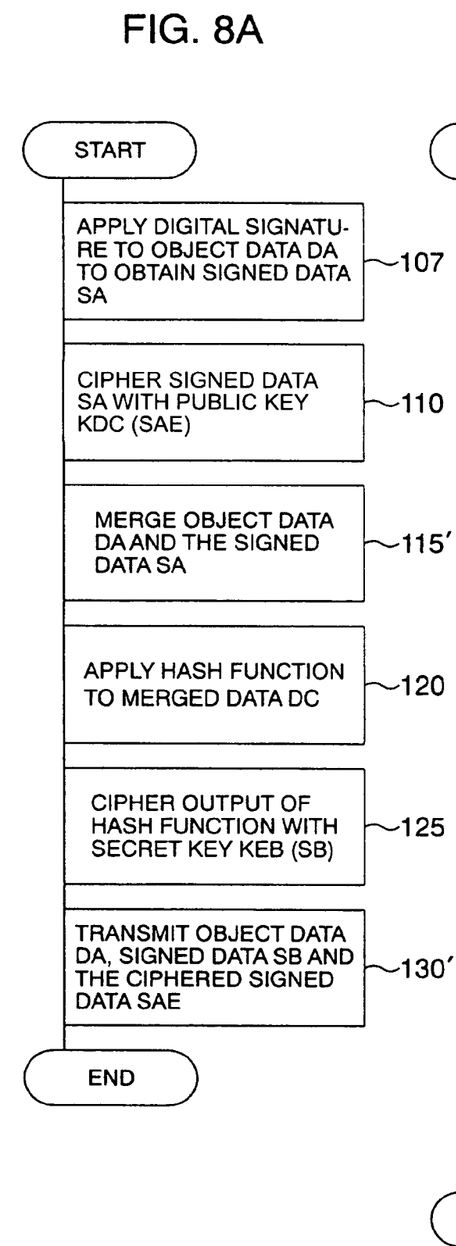
FIGS. 8A and 8B are flow charts showing data transmission side processing and data reception side processing in a data transmission method according to another embodiment of the present invention, respectively.
Figure 8B:
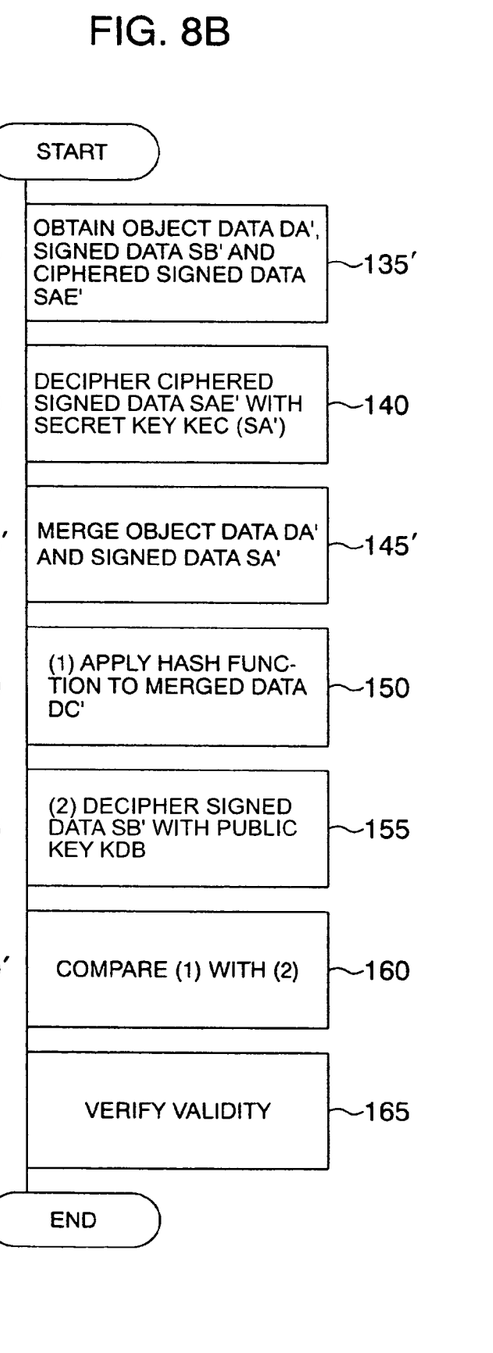

FIGS. 8A and 8B show processing flows when object data DA which is an original image is exchanged between a data transmission side and a data reception side. Steps similar to those in FIGS. 1A and 1B are referenced correspondingly.

FIG. 8A is a flow of processing carried out on the data transmission side. A digital signature is applied to the object data DA which is an original image, so that signed data SA is obtained (Step 107). The signed data SA is ciphered with a public key KDC of a service process portion of the data reception side, so that ciphered signed data SAE is obtained (Step 110). Next, the object data DA and the signed data SA are merged to form a block of data (Step 115'). A hash function is applied to merged data DC with a secret key of the data transmission side so that signed data SB is obtained (Step 125). The data DA, SB and SAE are transmitted to the data reception side (Step 130).

On the other hand, FIG. 8B is a flow of processing carried out on the data reception side. Here, object data DA', signed data SB' and ciphered signed data SAE' are received (Step 135'). The ciphered signed data SAE' is enciphered with a secret key KEC of the service process portion of the data reception side so that data SA' is obtained (Step 140). The data DB' and SA' are merged to form a block of data (Step 145'), and a hash function is applied to merged data DC' (Step 150). Then, the signed data SB' is enciphered with a public key KDB of the data transmission side (Step 155). The results of Steps 150 and 155 are compared (Step 160). On the basis of the result of the comparison, it is possible to verify whether an illegal act was effected or not (Step 165).

Similarly to the embodiment of FIGS. 1A and 1B, the important point in this processing is that one who can encipher the ciphered signed data SAE' is the data reception side because the data reception side has a secret key thereof. Even if a listener-in substitutes data or remakes signed data with the substituted data and the ciphered signed data, the results in Step 160 cannot agree with each other. Also in this embodiment, the ciphered signed data is not always necessary to be signed data of the original image, but it may be information relating to the original image, or the like. Thus, also in this embodiment, advantageous effects similar to those in the embodiment of FIGS. 1A and 1B can be obtained.

Conventionally, when data produced by a digital signature is listened in on a network and a secret key used therefor is stolen, there has arisen a problem that the listener-in may substitute the data and transmit the substituted data by impersonation so that wrongful processing is carried out on the data reception side. However, according to the aforementioned embodiments, such a data substitution or such an illegal act based on impersonation can be verified on the data reception side.

While the invention has been particularly described and shown with reference to the preferred embodiments thereof, it will be understood by those skilled in the art that various changes in form and detail and omissions may be made therein without departing from the scope of the invention. For example, although the above description is aimed at the case where images obtained by scanning paper and thereafter processing are exchanged via networks, the present invention is not limited to such a case. For example, it is also applicable to the case where forms or the like are stored in recording media such as magnetic disks, optical disks, semiconductor memories, or the like, and images obtained by reading out original images from such recording media and thereafter processing the original images are exchanged via networks.

What is claimed is:

1. A method for making an electronic exchange of an image using a digital signature, wherein the image to be exchanged is obtained by processing an original image of written information read out of a recording medium, between a data transmission side and a data reception side via a network, said method comprising:

a data transmission step on said data transmission side; and a data reception step on said data reception side;

wherein said data transmission step comprises:

a first step of processing said original image so as to produce partial image which forms a part of said original image, a second step of applying a digital signature to said original image so as to produce first signed data, a third step of ciphering said first signed data with a public key of said data reception side so as to produce a ciphered signed data, a fourth step of merging said partial image and said first signed data, applying a one-way function to the merged data, and ciphering an output of said one-way function with a secret key of said data transmission side so as to obtain second signed data, and a fifth step of transmitting said partial image, said second signed data and said ciphered signed data to said data reception side;

wherein said data reception step comprises:

a sixth step of obtaining said partial image, said second signed data and said ciphered signed data, a seventh step of deciphering said obtained ciphered signed data with a secret key of said data reception side so as to obtain third signed data, an eighth step of merging said obtained partial image and said third signed data and applying a one-way function to the merged data, a ninth step of deciphering said received second signed data with a private key of said data transmission side, and a tenth step of comparing results of said eighth and ninth steps so as to verify data validity.

2. A method according to claim 1, wherein said recording medium including paper, and said original image is an image of said written information on said paper read out by scanning said paper.

3. A method according to claim 1, wherein said written information includes a string of characters.

4. A method according to claim 1, wherein said first signed data in said second step includes signed data obtained by applying a digital signature to data relating to said original image.

5. A method according to claim 4, wherein said data relating to said original image includes a volume of data of said original image.

6. A method according to claim 4, wherein said data relating to said original image includes a number of black pixels included in a binarized image obtained by image-processing said original image.

7. A method for making an electronic exchange of an image using a digital signature, wherein the image to be exchanged is obtained by processing an original image of written information read out of a recording medium, between a data transmission side and a data reception side via a network, said method comprising:
a data transmission step on said data transmission side; and
a data reception step on said data reception side;
wherein said data transmission step comprises:
a first step of processing said original image so as to produce partial image which forms a part of said original image,
a second step of applying a digital signature to said original image so as to produce first signed data,
a third step of ciphering said first signed data with a public key of said data reception side so as to produce a ciphered signed data,
a fourth step of merging said partial image and said first signed data, applying a one-way function to the merged data, and ciphering an output of said one-way function with a secret key of said data transmission side so as to obtain second signed data, and
a fifth step of transmitting said partial image, said second signed data and said ciphered signed data to said data reception side;
wherein said data reception step comprises:
a sixth step of obtaining said partial image, said second signed data and said ciphered signed data,
a seventh step of deciphering said obtained ciphered signed data with a secret key of said data reception side so as to obtain third signed data,
an eighth step of merging said obtained partial image and said third signed data and applying a one-way function to the merged data,
a ninth step of deciphering said received second signed data with a private key of said data transmission side, and
a tenth step of comparing results of said eighth and ninth steps so as to verify data validity,
wherein said data reception side further sends said third signed data obtained in said seventh step to said data transmission side when a comparison result in said tenth step exhibits disagreement between outputs of said eighth and ninth steps; and
wherein said data transmission side searches for an original image corresponding to signed data coinciding with said third signed data sent to the data transmission side.

8. A data transmission apparatus comprising:
first ciphering means for receiving an electronic image of an original image and a first secret key as inputs, and outputting a first digital signature obtained by ciphering said electronic image with said first secret key;
processing means for receiving said electronic image as input, and outputting a partial image which forms a part of said original image of said electronic image;
second ciphering means for receiving said partial image, said first digital signature and a second secret key as inputs, merging said partial image and said first digital signature, ciphering obtained merged data with said second secret key, and outputting an obtained second digital signature;
third ciphering means for receiving said first digital signature and a public key as inputs, and obtaining ciphered data of said first digital signature with said public key; and
transmitting means for transmitting said partial image, said second digital signature, and said ciphered data of said first digital signature to an external data channel.

9. A data transmission apparatus according to claim 8, wherein said first digital signature includes a digital signature obtained by ciphering data relating to said original image with said first secret key.

10. A data transmission apparatus according to claim 9, wherein said data relating to said original image includes a volume of data of said original image.

11. A data transmission apparatus according to claim 9, wherein said data relating to said original image includes a number of black pixels included in a binarized image obtained by processing said original image.

12. A data transmission apparatus according to claim 8, further comprising a scanner for scanning written paper to thereby produce said electronic image of said original image.

* * * * *